US012227128B2

(12) United States Patent
Johannessen

(10) Patent No.: US 12,227,128 B2
(45) Date of Patent: Feb. 18, 2025

(54) SYSTEMS AND METHODS FOR IMPROVED LIGHTING

(71) Applicant: B/E AEROSPACE, INC., Winston Salem, NC (US)

(72) Inventor: Eric Johannessen, Holbrook, NY (US)

(73) Assignee: B/E AEROSPACE, INC., Winston Salem, NC (US)

( * ) Notice: Subject to any disclaimer, the term of this patent is extended or adjusted under 35 U.S.C. 154(b) by 685 days.

(21) Appl. No.: 17/385,690

(22) Filed: Jul. 26, 2021

(65) Prior Publication Data

US 2023/0027737 A1    Jan. 26, 2023

(51) Int. Cl.
| | | |
|---|---|---|
| *H05B 45/20* | (2020.01) |
| *B60Q 3/43* | (2017.01) |
| *B60Q 3/47* | (2017.01) |
| *B64D 11/00* | (2006.01) |
| *H05B 47/19* | (2020.01) |

(52) U.S. Cl.
CPC ............ *B60Q 3/47* (2017.02); *B60Q 3/43* (2017.02); *B64D 11/00* (2013.01); *H05B 45/20* (2020.01); *H05B 47/19* (2020.01); *B64D 2011/0038* (2013.01); *B64D 2203/00* (2013.01)

(58) Field of Classification Search
CPC ........ H05B 45/20; H05B 47/10; H05B 47/19; B60Q 3/47; B60Q 3/43; B64D 11/00; B64D 2011/0038; B64D 2203/00
See application file for complete search history.

(56) References Cited

U.S. PATENT DOCUMENTS

| | | | |
|---|---|---|---|
| 7,489,089 B2* | 2/2009 | Gandhi | H05B 45/20 315/129 |
| 9,192,013 B1 | 11/2015 | van De Ven et al. | |
| 9,593,812 B2 | 3/2017 | van De Ven et al. | |
| 10,141,533 B2 | 11/2018 | Sam et al. | |
| 2011/0309746 A1 | 12/2011 | Eckel et al. | |
| 2019/0394853 A1 | 12/2019 | Soer et al. | |

OTHER PUBLICATIONS

European Patent Office, European Search Report dated Feb. 14, 2023 in Application No. 22186796.3.
European Patent Office, European Partial Search Report dated Nov. 14, 2023 in Application No. 22186796.3.
European Patent Office, European Office Action dated Sep. 16, 2024 in Application No. 22186796.3.

* cited by examiner

*Primary Examiner* — Jimmy T Vu
(74) *Attorney, Agent, or Firm* — SNELL & WILMER L.L.P.

(57) ABSTRACT

A method may comprise: commanding, by a processor, a lighting system to generate a first desired effect in accordance with a first spectral weighting mode; determining, by the processor, a first optimized predetermined variable within a first predetermined domain to generate the desired effect based on the first spectral weighting mode; commanding, by the processor, the lighting system to transition from the first desired effect to a second desired effect, the second desired effect in accordance with a second spectral weighting mode; and determining by the processor, a second optimized predetermined variable within a second predetermined domain to generate the second desired effect based on the second spectral weighting mode, the first optimized predetermined variable being different from the second optimized predetermined variable.

14 Claims, 6 Drawing Sheets
(1 of 6 Drawing Sheet(s) Filed in Color)

SYSTEMS AND METHODS FOR IMPROVED LIGHTING

FIELD

The present disclosure relates generally to lighting systems and methods and, more particularly, to varying lighting system outputs based on various parameters for aircrafts.

BACKGROUND

Color mixing schemes are used to provide lighting accents generally via indirect lighting (i.e., an area is illuminated primarily by light from the illumination source that is reflected off of another surface). Various moods may be created, particularly when colored lighting is used.

Advances in light emitting diode ("LED") technology has made LEDs an ideal source of light where low-powered lighting solutions are desirable, such as in an aircraft, where power availability is limited. Recently, new technologies have become available that have the potential to enhance the usefulness of LEDs generally, but which have not been fully realized in the context of aircraft lighting.

SUMMARY

An article of manufacture is disclosed herein. The article of manufacture may include a tangible, non-transitory computer-readable storage medium having instructions stored thereon that, in response to execution by a processor, cause the processor to perform operations comprising: command, by the processor, a lighting system to generate a first desired effect in accordance with a first spectral weighting mode; determine, by the processor, a first optimized predetermined variable within a first predetermined domain to generate the desired effect based on the first spectral weighting mode; command, by the processor, the lighting system to transition from the first desired effect to a second desired effect, the second desired effect in accordance with a second spectral weighting mode; and determine by the processor, a second optimized predetermined variable within a second predetermined domain to generate the second desired effect based on the second spectral weighting mode, the first optimized predetermined variable being different from the second optimized predetermined variable.

In various embodiments, the second predetermined domain is different from the first predetermined domain. The first predetermined domain may include chromacity coordinates, and the second predetermined domain may include color brightness temperature. The operations may further comprise: command, by the processor, the lighting system to transition from the second desired effect to a third desired effect, the third desired effect in accordance with a third spectral weighting mode; and determine by the processor, a third optimized predetermined variable within a third predetermined domain to generate the third desired effect based on the third spectral weighting mode. The third optimized predetermined variable may be different from the second optimized predetermined variable and the first optimized predetermined variable. The first predetermined domain, the second predetermined domain, and the third predetermined domain may all be different. The first predetermined domain may include chromacity coordinates, the second predetermined domain may include color temperature brightness, and the third predetermined domain is color brightness.

A lighting system is disclosed herein. The lighting system may comprise: a plurality of light emitting diodes (LEDs); and a controller in operable communication with the plurality of LEDs, the controller configured to transition the plurality of LEDs from a first spectral weighting mode to a second spectral weighting mode, the first spectral weighting mode configured to optimize a first variable of the lighting system over a first predetermined domain, the second spectral weighting mode configured to optimize a second variable of the lighting system over a second predetermined domain, the first predetermined domain being different from the second predetermined domain, the first spectral weighting mode corresponding to a first desired effect, the second spectral weighting mode corresponding to a second desired effect.

In various embodiments, the plurality of LEDs may comprise at least five LEDs. The plurality of LEDs may comprise at least six LEDs. A first LED of the plurality of LEDs may be configured to emit electromagnetic radiation having a first wavelength of between 490 nm and 510 nm and generate a cyan color. The first variable may include an intensity of the first LED and the first desired effect is peak wakefulness. The first variable may be maximized to achieve the first desired effect. Each LED in the plurality of LEDs may be configured to emit an electromagnetic radiation having a wavelength, the wavelength being different for each LED in the plurality of LEDs.

A light assembly for an aircraft cabin is disclosed herein. The light assembly may comprise: a housing defining a mating surface, a reflective surface, the housing extending having a back end being distal from a front end, the front end including a light outlet; and a light unit disposed proximate the back end, the light unit comprising: a first light emitting diode (LED) configured to emit a first electromagnetic radiation having a first wavelength; a second LED configured to emit a second electromagnetic radiation having a second wavelength; a third LED configured to emit a third electromagnetic radiation having a third wavelength; a fourth LED configured to emit a fourth electromagnetic radiation having a fourth wavelength; and a fifth LED configured to emit a fifth electromagnetic radiation having a fifth wavelength, wherein the first wavelength the second wavelength, the third wavelength, the fourth wavelength and the fifth wavelength are all different wavelengths.

In various embodiments, the reflective surface includes a parabolic shape extending from the back end to the front end. The first LED, the second LED, the third LED, the fourth LED, and the fifth LED may be configured to mix prior to exiting the front end. The light assembly may further comprise a controller in operable communication with the light unit, the controller configured to transition the light unit from a first spectral weighting mode to a second spectral weighting mode. The first spectral weighting mode may be configured to optimize a first variable of the lighting system over a first predetermined domain, the second spectral weighting mode configured to optimize a second variable of the lighting system over a second predetermined domain, and the first predetermined domain being different from the second predetermined domain. The first spectral weighting mode may correspond to a first desired effect, and the second spectral weighting mode may correspond to a second desired effect.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

The patent or application file contains at least one drawing executed in color. Copies of this patent or patent application publication with color drawing(s) will be provided by the Office upon request and payment of the necessary fee.

DETAILED DESCRIPTION

Figure 1:
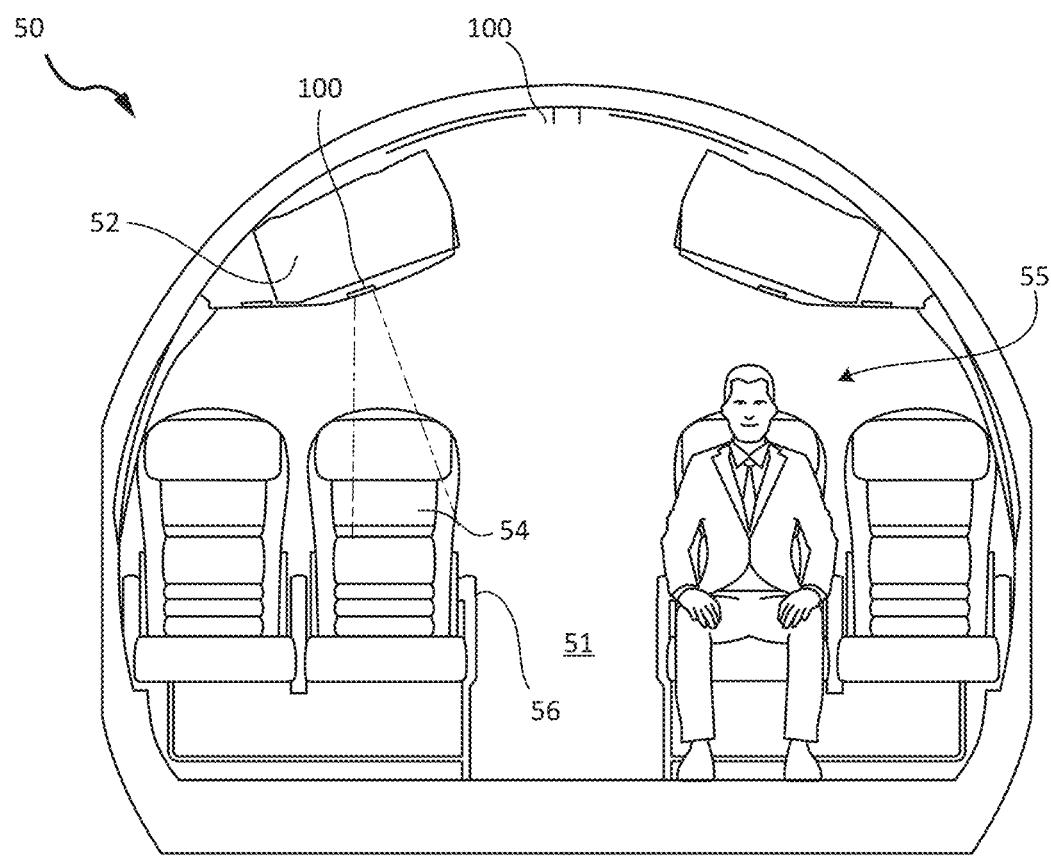
FIG. 1 illustrates an aircraft cabin, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Disclosed herein are systems and methods to apply multiple light emitting diodes (LEDs) (e.g., quantum dots ("QDOTs"), organic LEDs (OLEDs), or any other LED) in a way that a spectral content achieves metamers/colors that are optimized for predefined operating modes. In various embodiments, an improved lighting assembly disclosed herein comprises five or more LEDs. In various embodiments, by utilizing at least five LEDs, a color gamut may be expanded, providing various degrees of freedom to mix colors. In various embodiments, the systems, methods, and assemblies disclosed herein may be configured to facilitate optimization of lighting based on color rendering index (CRI), output, circadian manipulation, gamut area optimization, or the like.

In various embodiments, a control system for lighting optimization is disclosed herein. In various embodiments, the control system is configured to transition between various spectral weighting modes. "Spectral weighting modes," as defined herein are various "modes" of lighting display configured to generate a desired effect by optimizing a predetermined variable (e.g., hypergamut, CRI, brightness, lumens, etc.) within a predetermined domain (e.g., chromacity coordinates (x,y), color temperature brightness (Kelvin), brightness (%), etc.).

"Color quality," or "hue" as disclosed herein refers to is a property of light which identifies color within the light spectrum. Hue is a value that changes, but does not increase or decrease (i.e., hue does not increase or decrease; hue changes from one color to another).

"Color saturation" as disclosed herein measures a vibrancy, or purity of a color. For example, a pure color (i.e., a 100% saturated color) includes no gray mixed in whereas a color with no saturation (i.e., a 0% saturated color) consists of a gray color.

"Color brightness" as disclosed herein is a measurement of how much light (i.e., white light) is seen in a color. For example, a color having 100% brightness would have full light and show up as white, whereas a color having 0% brightness would have no light and show up as black.

"Color brightness" as disclosed herein is composed of two distinct characteristics, namely luminous flux (i.e., the amount of light emitted per second in a unit solid angle of one steradian from a uniform source of one candela measured in lumens) and color temperature (i.e., the color of the light that is produced by a respective bulb). For example, the higher the color temperature, the cooler light gets, and the lower the color temperature, the warmer light gets. In various embodiments, a warm color temperature as disclosed herein may be between 2000 K and 3500 K, a cool color temperature may be between 3500 K and 5000 K, and a full spectrum of color temperatures may be between 5000 K and 8000 K.

"Color rendering index (CRI)," as disclosed herein refers to a quantitative measure of the ability of a light source to reveal the colors of various objects faithfully in comparison with an ideal or natural source. Light sources with a high CRI may be desirable in color critical applications, such as neonatal care, eating or the like. CRI is measured in accordance with International Commission on Illumination (CIE) $R_a$ index, which ranges from 0 to 100.

"Metamers" as disclosed herein refers to color stimuli that have different spectral radiant power distributions but are perceived as identical for a given observer.

With reference to FIG. 1, a cabin 51 of an aircraft 50 is shown, according to various embodiments. The aircraft 50 may be any aircraft such as an airplane, a helicopter, or any other aircraft. The aircraft 50 may include various lighting systems 10 that emit visible light to the cabin 51. Pathogens, such as viruses and bacteria, may remain on surfaces of the cabin 51, and these remaining pathogens may result in indirect contact transmission to other people (e.g., subsequent passengers). For example, the cabin 51 may include overhead bins 52, passenger seats 54 for supporting passengers 55, handles 56, lavatory surfaces, and other structures/surfaces upon which active pathogens may temporarily reside. As will be discussed further below, various spectral weighting modes may be provided, controlled, and switched between for a lighting system 100, enhancing a cabin feel/experience, in accordance with various embodiments. The lighting systems 10 may be broken down into different addressable lighting regions that could be used on an aircraft. For example, the regions on an aircraft may include sidewall lighting, cross-bin lighting, over wing exit lighting, ceiling lighting, direct lighting, flex lights, reading lights, dome lights, lavatory lights, mirror lights, cockpit lights, cargo lights, etc. The regional breakdown of the lighting system allows lighting control over broad areas of the aircraft.

Figure 2:
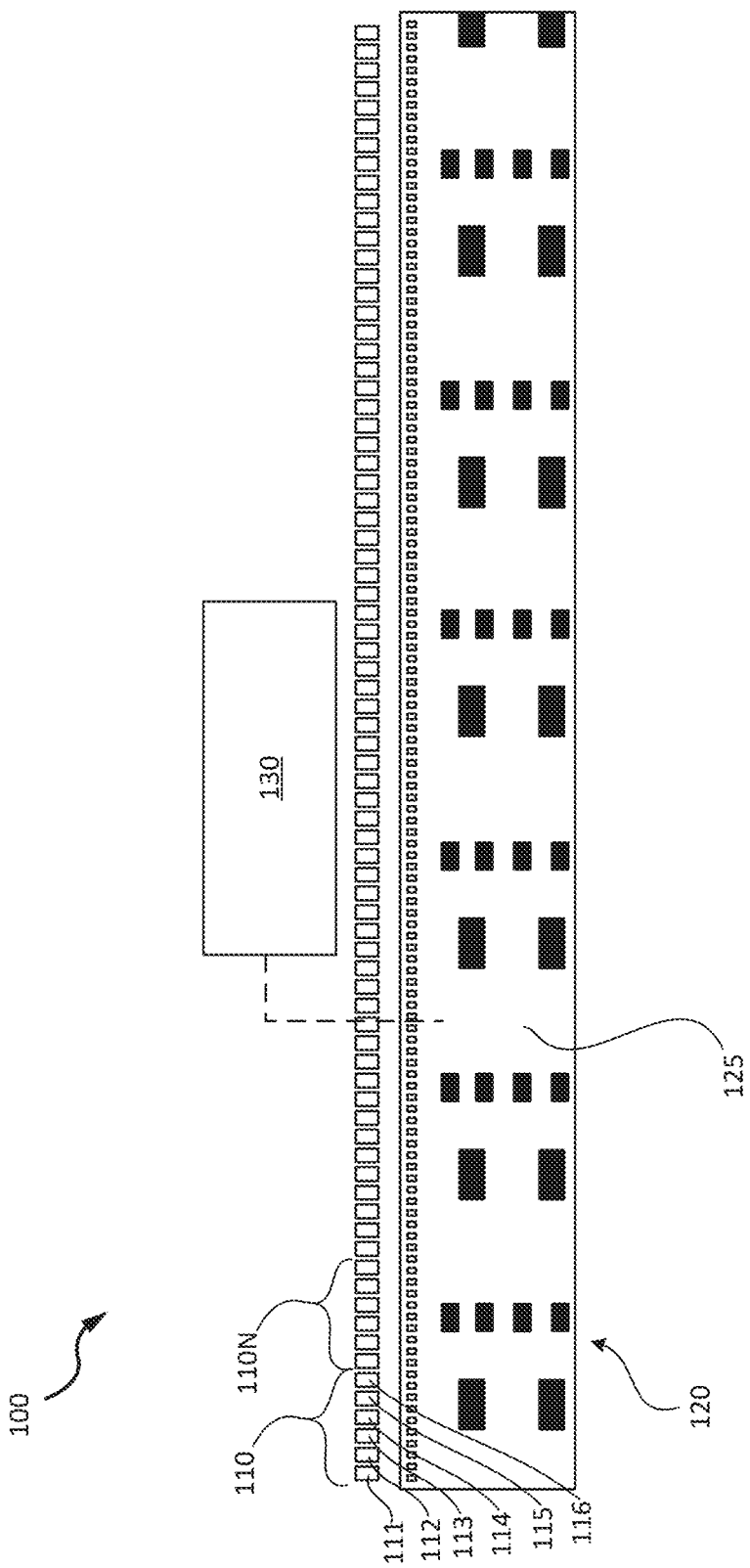
FIG. 2 illustrates a perspective view of a light system including at least one lighting unit, circuitry, and a controller, in accordance with various embodiments.

In various embodiments, and with reference to FIG. 2, a lighting system 100 is provided. The lighting system 100 may be one or more of the lighting systems 10 of the aircraft 50 from FIG. 1. The lighting system 100 generally includes a lighting unit 110, circuitry 120, and a controller 130, according to various embodiments. The lighting unit 110, according to various embodiments, includes a plurality of light-emitting diodes ("LEDs"), each LED in the plurality of LEDs configured to emit electromagnetic radiation in a predetermined wavelength. Additional details pertaining to the lighting unit 110, the circuitry 120, and the controller 130 are provided below.

The term "lighting unit," as used herein, generally refers to an array of discrete LEDs that are controlled to blend their respective radiations to collectively produce a desired color quality, color saturation, and color brightness of electromagnetic radiation. In various embodiments, the lighting unit disclosed herein is configured to transition between various spectral weighting modes, which are configured to generate a desired effect by optimizing a predetermined variable (e.g., hypergamut, CRI, brightness, lumens, etc.) within a predetermined domain (e.g., chromacity coordinates (x,y), color temperature brightness (Kelvin), brightness (%), etc.).

In various embodiments, the lighting unit 110 include a first LED 111 configured to emit first electromagnetic radiation having a first wavelength of between about 630 nanometers ("nm") and about 740 nm (e.g., red light), a second LED 112 configured to emit second electromagnetic radiation having a second wavelength of between about 580 nm and about 630 nm (e.g., amber light), a third LED 113 configured to emit third electromagnetic radiation having a third wavelength between about 540 nm and about 580 nm (e.g., a lime), a fourth LED 114 configured to emit a fourth electromagnetic radiation having a fourth wavelength between about 510 nm and about 540 nm (e.g., green), a fifth LED 115 configured to emit a fifth electromagnetic radiation having a fifth wavelength between about 490 nm and 510 nm (e.g., cyan), and/or a sixth wavelength between about 440 nm and about 490 nm (e.g., blue).

In various embodiments, the lighting unit may include more, or less than these six LEDs. For example, the lighting unit may include 5, 6, 7, or 8 LEDs, and these additional LEDs may be other colors, such as amber, cyan, etc. For example, a lighting unit having a (red, green, blue white} configuration, (a red, green blue, ultraviolet, white configuration), a (white, white, blue configuration), a (white, white) configuration, etc. are within the scope of this disclosure.

Figure 3:
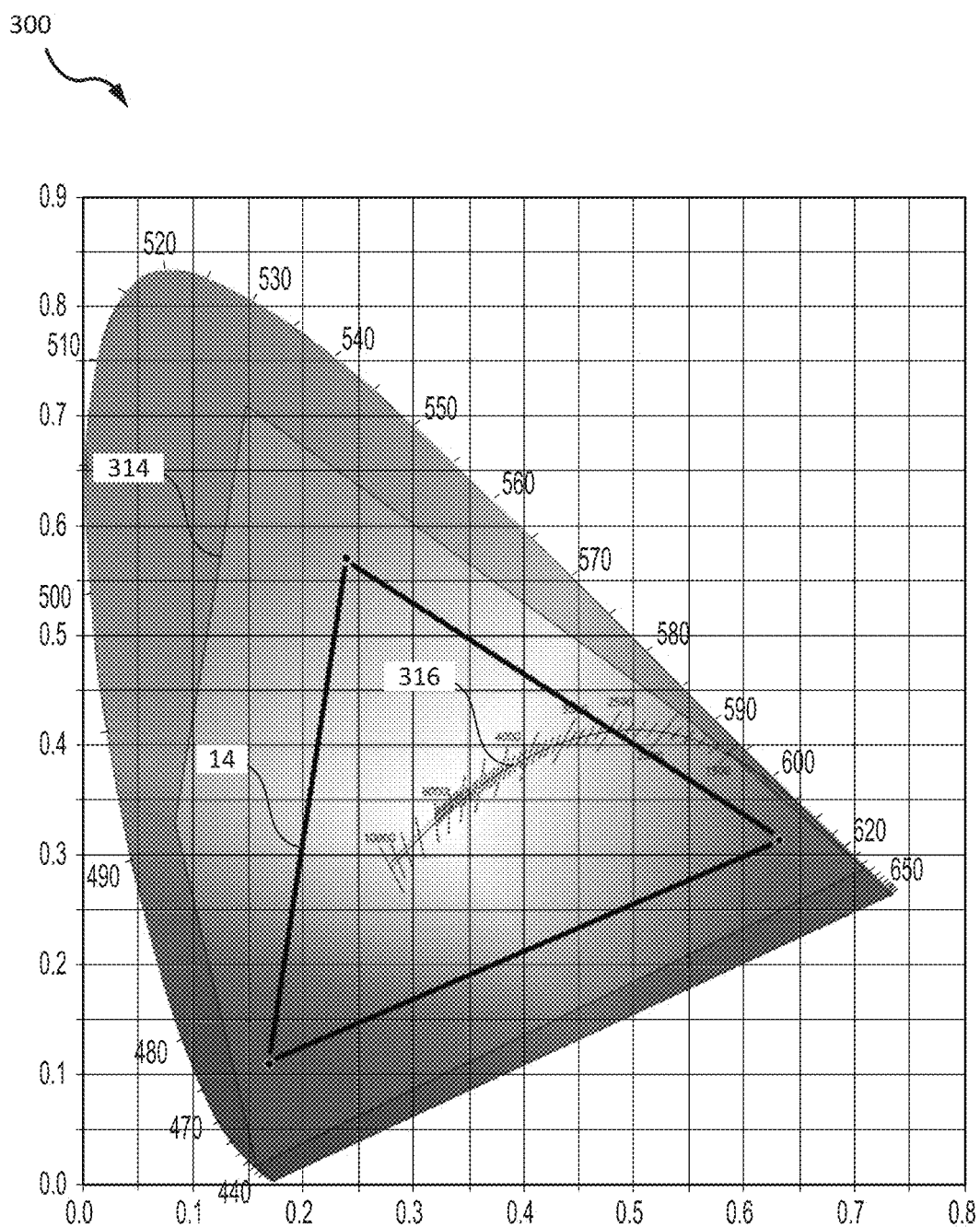
FIG. 3 is a color space chromaticity diagram from the International Commission on Illumination ("CIE"), commonly referred to as a CIE 1931 system diagram, showing various triangular color gamuts, in accordance with various embodiments.
Figure 4:
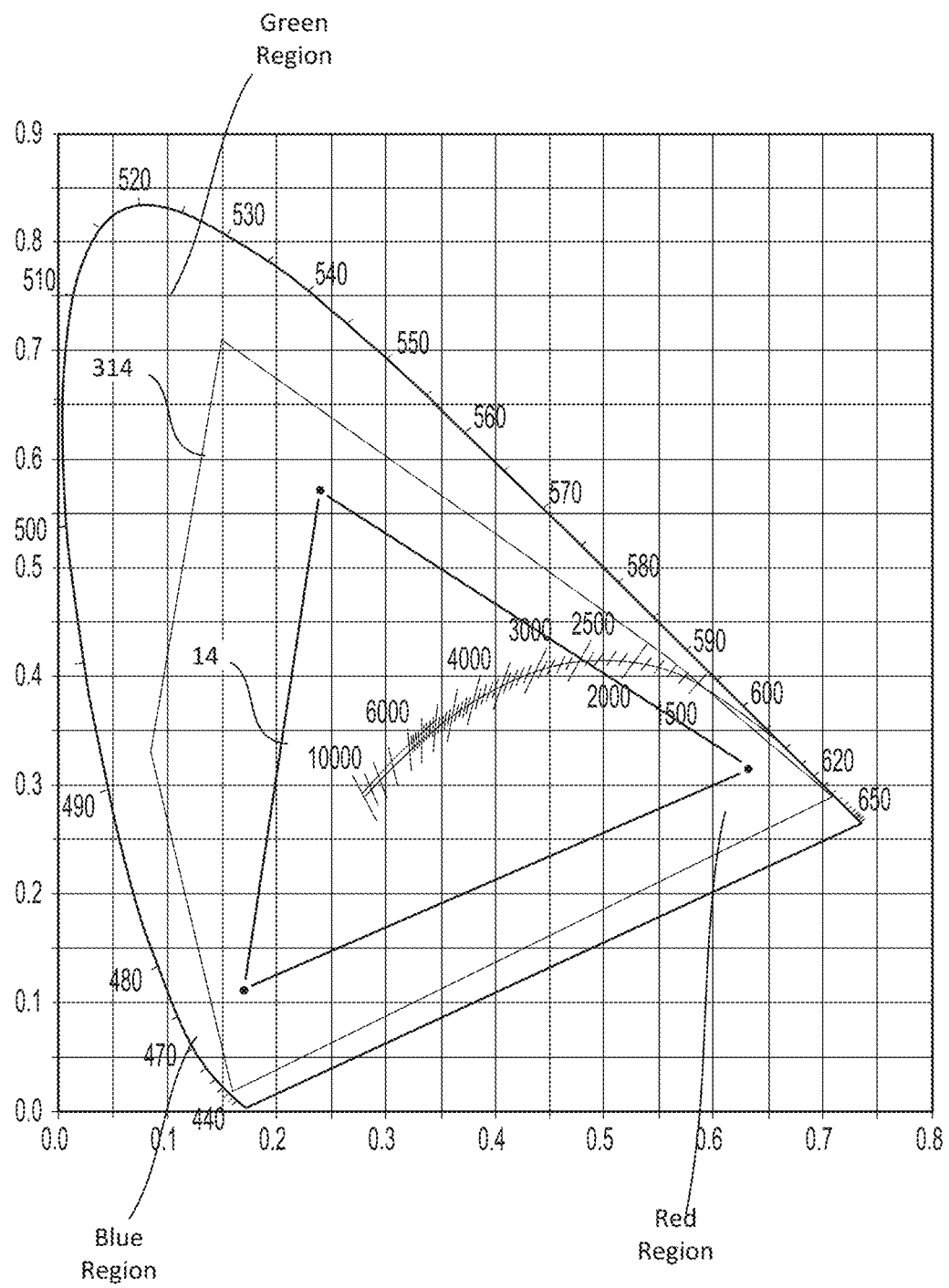
FIG. 4 is a black and white representation of the color space chromaticity diagram of FIG. 3, with various color regions labeled, in accordance with various embodiments.

In various embodiments, and with momentary reference to FIG. 3, a color space chromaticity diagram from the International Commission on Illumination ("CIE"), commonly referred to as a CIE 1931 system diagram 300, is provided. FIG. 4 is a black and white representation of FIG. 3 with various regions of the CIE 1931 system diagram 30 labeled with their respective colors. That is, FIG. 4 is labeled with a red region, a green region, and a blue region. The CIE 1931 system diagram 300 shows a conventional color gamut 14 in which a conventional blue LED 13 is utilized in a conventional lighting unit, and the CIE 1931 system diagram 300 also shows an improved color hyper-gamut 314 provided by the lighting system 100 disclosed herein.

Returning to reference FIG. 2, the circuitry 120 of the lighting system 100 may include a circuit board 125 and may generally include various integrated circuit components which may carry out a variety of functions under the control of the controller 130. In various embodiments, the combination of the lighting unit 110 and the circuitry 120 is referred to as a lighting assembly, and the lighting assembly is configured to be driven/controlled by the controller 130, as described in greater detail below. The particular implementations shown and described herein are illustrative examples of an LED lighting assembly, and are thus not intended to otherwise limit the scope of the present disclosure in any way. For the sake of brevity, conventional electronics other components of the circuitry (such as power supplies and power modulators) may not be described in detail. The circuitry 120 is electrically coupled to the lighting unit 110 to supply respective driving signals to each of the LEDs 111, 112, 113, 114, 115, 116. In various embodiments, the lighting unit 110 may include additional LEDs, such as a white LED. In various embodiments, the lighting unit consists of only the six LEDs 111, 112, 113, 114, 115, 116 described above, and thus may not include other LEDs. In various embodiments, the lighting unit consists of only five LEDs. The lighting unit 110 may be replicated/repeated along a strip of circuit board 125. In various embodiments, the lighting unit 110 may include a diffuser lens (or diffuser lenses) covering the LEDs 111, 112, 113, and these lens(es) may comprise a glass material, a polymethyl methacrylate material, and/or a polyamide material, among others.

In various embodiments, and with continued reference to FIG. 2, the controller 130 of the light system 100 may be affixed/integrated into the circuitry 120 or the controller 130 may be integrated into computer systems onboard an aircraft. The controller 130 in FIG. 2 is shown schematically, and thus the size, position, and orientation of the controller may be different than what is depicted in FIG. 2. In various embodiments, the controller 130 comprises a processor. In various embodiments, the controller 130 is implemented in a single processor. In various embodiments, the controller 130 may be implemented as and may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. The controller 130 may comprise a processor configured to implement various logical operations in response to execution of instructions, for example, instructions stored on a non-transitory, tangible, computer-readable medium (i.e., the memory) configured to communicate with the controller 130. Furthermore, any number of conventional techniques for electronics configuration, signal processing and/or control, data processing and the like may be employed. Also, the processes, functions, and instructions may can include software routines in conjunction with processors, etc.

System program instructions and/or controller instructions may be loaded onto a non-transitory, tangible computer-readable medium having instructions stored thereon that, in response to execution by the processor, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

The instructions stored on the memory of the controller 130 may be configured to perform various operations. The schematic flow charts disclosed further herein include various exemplary controller methods 600, 700 in FIGS. 6 and 7 that the processor of the controller 130 may perform. Generally, the controller 130 electrically coupled to the circuitry 120 and is configured to transition between, by the processor, various spectral weighting modes. Controlling the spectral weighting modes of the light of the LEDs 111, 112, 113, 114, 115, 116 may include blending the first electromagnetic radiation, the second electromagnetic radiation, the third electromagnetic radiation, the fourth electromagnetic radiation, the fifth electromagnetic radiation, and the sixth electromagnetic radiation in a manner to achieve a desired effect by optimizing a predetermined variable (e.g., hypergamut, CRI, brightness, lumens, etc.) within a predetermined domain (e.g., chromacity coordinates (x,y as shown in FIGS. 3-4), color temperature brightness (Kelvin), brightness (%), etc.). In various embodiments, controlling the spectral weight modes of the light of the LEDs 111, 112, 113, 114, 115, 116 may include transitioning between various spectral weighting modes based on the desired effect for the cabin 50 from FIG. 1.

Figure 5:
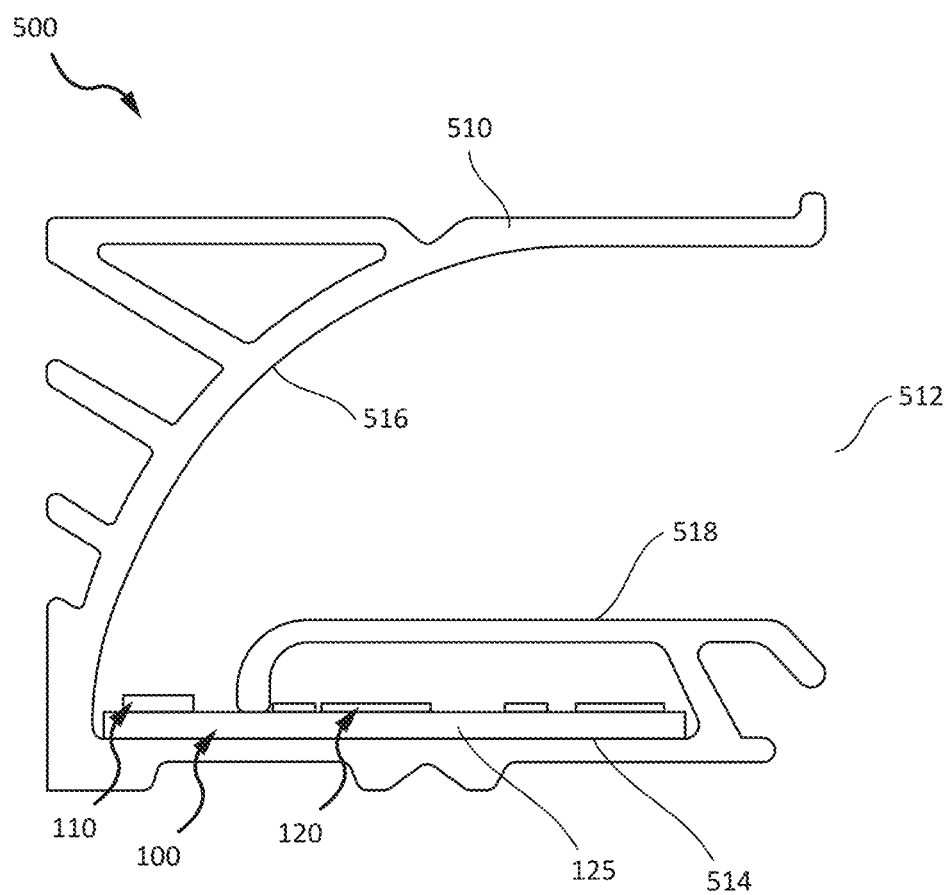
FIG. 5 illustrates a side view of a light assembly 500, in accordance with various embodiments.

Referring now to FIG. 5, a light assembly 500 is illustrated in accordance with various embodiments. The light assembly 500 includes the lighting system 100 of FIG. 2. In various embodiments, the light assembly 500 comprises a housing 510. The housing 510 defines a light outlet 512 at a front end of the housing. In various embodiments, the housing 510 defines a mating surface 514. The circuit board 125 of the lighting system 100 is configured to be coupled to the mating surface 514, via an adhesive, fasteners or the like. In various embodiments, the circuitry 120 is housed within a portion 518 of the housing 510, whereas the light unit 110 is disposed external to the portion 518 of the housing. The light assembly 500 further comprises a reflective surface 516 extending from a location proximate the light unit along a parabolic path to the light outlet 512.

In various embodiments, the light assembly 500 facilitates improved mixing of the LEDs 111, 112, 113, 114, 115, 116 of light unit 110 from FIG. 2. In this regard, due to the number of LEDs, only distance or diffusion can ensure sufficient mixture to achieve a desired effect. In various embodiments, by having the reflective surface 516 be a half parabola shape, the circuit board 125 may be a single board design along a length of an aircraft (i.e., the circuit board 125 may extend the length of the aircraft), which may reduce cost for various lighting system. Additionally, the half parabola shape of the reflective surface 516 may allow positioning of the lighting unit 110 at a back end of the circuit board (i.e., way from the light outlet), where the lighting unit is typically disposed at a front end of a housing. Thus, the reflective surface 516 is essentially a parabolic reflector that integrates light from the lighting unit 110 and reflects it forward and out the light outlet 512. In various embodiments, the configuration of light assembly 500 helps with efficiency of the lighting system 100 because the configuration allows for greater directionalization of the light and gives additional mixing distance relative to typical light assemblies and system. In various embodiments, the reflective surface 516 may comprise a polished aluminum surface, a white plastic gloss, or the like.

In various embodiments, the lighting system 100 disclosed herein facilitates application of spectral weighting modes. A "spectral weighting mode" may be customizable and adaptable to achieve a desired effect by optimizing a predetermined variable (e.g., hypergamut, CRT, brightness, lumens, etc.) within a predetermined domain (e.g., chromacity coordinates (x,y), color temperature brightness (Kelvin), brightness (%), etc.).

Full Gamut Spectral Weighting Mode

A "full gamut spectral weighting mode" includes optimizing a color saturation within the chromacity coordinates from FIGS. 3 and 4 (e.g., x, y coordinates). In this regard, in the "full gamut spectral weighting mode", the lighting system 100 may be configured to create any color and optimize for color saturation regardless of color quality via mixing various LEDs of the lighting unit 110. In this regard, if the desired color is within the hyper-gamut 314 of FIG. 3, the color saturation will be 100%, and if the desired color is outside of the hypergamut, the color saturation will be reduced towards achromatic white.

CRI Spectral Weighting Mode

A "CRT optimized spectral weighting mode" includes optimizing for CRT. In this regard, the CRT optimized spectral weighting mode may achieve a desired effect of producing natural, or apparently natural white light. The CRT optimized spectral weighting mode could be used for boarding of an aircraft or the like. The CRT optimized spectral weighting mode may include a range for an acceptable CRT (e.g., 95-100), which may be selected from within a range defined by the Planckian locus 316 from FIG. 3. In this regard, a color temperature brightness (Kelvin) may be selected based on a desired effect (e.g., 2700 Kelvin for warm light, which may be similar to an incandescent bulb).

R9 Spectral Weighting Mode

An "R9 optimized spectral weighting mode" includes optimizing for R9. "R9" as referred to herein represents how accurately a light source will reproduce strong red colors. In various embodiments, R9 is similar to CRT optimized except that R9 is given greater weight relative to CRT in color temperature determination. In this regard, upon selecting a color temperature in a manner similar to the CRI spectral weighting mode, a maximum R9 may be determined, followed by determining a maximum CRI corresponding to the maximum R9. In various embodiments, the color temperature range for the R9 spectral weighting mode may be between 2,000 K and 4,000 K. In this regard, R9 optimized may focus on red and warmer colors for the desired effect, in accordance with various embodiments.

True Black Body Spectral Weighting Mode

A "true black body spectral weighting mode" may essentially comprise an incandescent mode with brightness determining color. In this regard, the true black body spectral weighting mode may achieve an effect of a dimmer or a gas lamp control. In this regard, when light is dimmed in accordance with the true black body spectral weighting mode not only is the light being dimmed, but it's changing color and/or getting warmer (e.g., color temperature is decreasing). In various embodiments, the true black body spectral weighting mode may optimize a color temperature brightness within a color brightness domain (e.g., between 0% and 100% color brightness). In various embodiments, the true black body spectral weighting mode may be selected over a range of color temperatures (e.g., between 1000 K and 5000K).

Efficacy Optimized Spectral Weighting Mode

An "efficacy optimized spectral weighting mode" may comprise maximizing luminous flux (or lumens) for cleaning, boarding, etc. In this regard, the efficacy optimized spectral weighting mode determines the brightest mix of the light unit 110. In this regard, the brightest white possible may be achieved by sacrificing CRI, color quality and various other factors to achieve the highest efficacy for a respective mixture of light unit 110 from FIG. 1. Thus, the efficacy optimized spectral weighting mode may maximize the brightness of the light, which may be a desired effect for cleaning, maintenance, boarding, or the like.

Photolum Optimized Spectral Weighting Mode

A "photolum optimized spectral weighting mode" may comprise optimizing for chagrining efficiency of photolum strips. In various embodiments, a walkway in an aircraft cabin may include photolum strips for an emergency egress. The photolum strips may be configured to charge during a flight. In various embodiments, an ideal light spectrum for charging photolum strips may include more cyan and blue, with less green while maintaining a metamer of white. Thus, an efficient charging photolum strip may be achieved without setting a lighting system to a higher brightness, in accordance with various embodiments.

Fluorescent Optimized Spectral Weighting Mode

A "fluorescent optimized spectral weighting mode" may comprise optimizing a royal blue color for remote phosphor/quantum dot emission. In various embodiments, royal blue may make colors pop, makeup pop, etc. In various embodiments, the royal blue optimization is performed in the color temperature brightness domain (e.g., between 4000 K and 8000 K). In various embodiments, the fluorescent optimized spectral mode may include using a large proportion of royal blue and opposing the royal blue light with amber to achieve a metamer of white that has a maximum, or optimized fluorescence. In this regard, logos configured for fluorescence may be created within cabins having a light unit 110 configured for the fluorescent optimized spectral weighting mode, in accordance with various embodiments.

Spectra Fill Optimized Spectral Weighting Mode

A "spectra fill optimized spectral weighting mode" may be configured to compliment or supplement panelized lighting, in accordance with various embodiments. For example, an organic LED (OLED) may be disposed on a cabin ceiling and configured to create a sky effect. The OLED may create white light with a color combination of red, green and blue that has low CRI and low color quality. Thus, the spectra fill optimized spectral weighting mode may focus mixing of LEDs in the light unit 110 heavily on ambers, limes, and cyans (i.e., areas of the spectrum that are missing from the OLED display), so that the lights mix all together in the cabin 50 from FIG. 1 to create a high quality continuous spectrum of light. In various embodiments, the optimization may be performed in the color temperature brightness domain (e.g., between 2000 K and 8000 K).

Maximum Melenopic Optimized Spectral Weighting Mode

A "maximum melenopic optimized spectral weighting mode" may be optimized for peak wakefulness, in accordance with various embodiments. There is a fourth photo receptor in the human eye that is not tied to conscious vision, but the subconscious. In various embodiments, the fourth photo receptor may subconsciously react to the color cyan. In this regard, when cyan is maximized in white light, melatonin is suppressed (e.g., during daytime) and when there is a lack of cyan, a human starts producing melatonin. Thus, a maximum melenopic optimized spectral weighting mode may maximize cyan in a mix to create white light within the color temperature brightness domain (e.g., between 2000 K and 8000 K). Thus, the maximum melenopic optimized spectral weighting mode may achieve a desired effect of peak wakefulness (e.g., during a morning flight or the like).

Minimum Melenopic Optimized Spectral Weighting Mode

Similarly, a "minimum melenopic optimized spectral weighting mode" may be optimized to commence melatonin production (i.e., to facilitate sleep), in accordance with various embodiments. In this regard, a minimum melenopic optimized spectral weighting mode may minimize cyan in a mix to create white light within the color temperature brightness domain (e.g., between 2000 K and 8000 K).

Food Optimized Spectral Weighting Mode

A "food optimized spectral weighting mode" may be optimized to enhance the appearance of food, in accordance with various embodiments. In this regard, the food optimized spectral weighting mode may balance adding additional fluorescence to a mix of light from light unit 110. In this regard, an LED configured to emit a blue color may be commanded to generate a greater color brightness relative to other LEDs in the light unit 110. Additionally, the food optimized spectral weighting mode may optimize for an R9 value as described previously herein, while maintaining relatively strong CRI and efficacy as well. In this regard, the food optimized spectral weighting mode may be more of a balance mode, in accordance with various embodiments. In various embodiments, the food optimized spectral weighting mode may be generated within the color temperature brightness domain (e.g., between 2000 K and 8000 K).

Balanced Spectral Weighting Mode

A "balance spectral weighting mode" may be configured to balance various predetermined variables. For example, the balanced spectral weighting mode may trade off between CRI, efficacy, R9, and fluorescence in a manner similar to food optimized spectral weighting mode. In various embodiments, the balanced spectral weighting mode may be generated within the color temperature brightness domain (e.g., between 2000 K and 8000 K).

NVIS Spectral Weighting Mode

A "night vision imaging systems (NVIS) spectral weighting mode" may be optimized to achieve a target output color such as those set forth in government standards, such as NVIS Green A, NVIS Green B, and/or NVIS White. Such standards may be found in the Department of Defense Interface Standard, entitled Lighting, Aircraft, Night Vision Imaging System (NVIS) Compatible. In this regard, optical filters may be eliminated, reducing costs of NVIS lighting systems.

Cycling Metamers Spectral Weighting Mode

A "cycling metamers spectral weighting mode" may be configured to a achieve a desired effect of flowing motion of cabin structures based on metamerism. In various embodiments, the cycling metamers spectral weighting mode may be generated within the color temperature brightness domain (e.g., between 2000 K and 8000 K). In various embodiments, the cycling metamers spectral weighting mode may be configured to cycle between royal blue emittance and cyan emittance. Visually, the light may appear to be the same color to an individual; however the spectrum will be changing as the cycling between royal blue and cyan occurs. In this regard, certain areas of the cabin will appear to pop out relative to other areas of the cabin and a wave type effect may be achieved in the aircraft cabin.

Gamut Area Optimized Spectral Weighting Mode

A "gamut area optimized spectral weighting mode" may be configured to a achieve a desired effect of maximizing color saturation over a range of camera inputs. In various embodiments, gamut area optimized spectral weighting mode may utilize a camera to analyze a cabin and then the gamut area optimized spectral weighting mode may be generated based on a processor determining which colors in the cabin are of interest and corresponding wavelengths of light that will be of interest for the respective cabin. In this regard, the gamut area optimized spectral weighting mode may be predetermined for a cabin and then implemented based on the analysis of cabin colors, in accordance with various embodiments.

Night Vision Optimized Spectral Weighting Mode

A "night vision optimized spectral weighting mode" may be optimized for a spectrum of mixed light dominated by deep red, which may dip into infrared, in accordance with various embodiments. In this regard, a desired effect of the night vision optimized spectral weighting mode may be a night mode, where the mix of LEDs are optimized for a warm light. In various embodiments, the night vision spectral weighting mode may be generated within a warmer area of the color temperature brightness domain (e.g., between 2000 K and 4000 K).

In various embodiments, the present disclosure is not limited with regard to the spectral weighting modes disclosed herein. It may be readily apparent to one skilled in the art that other spectral weighting modes may be desirable.

Figure 6:
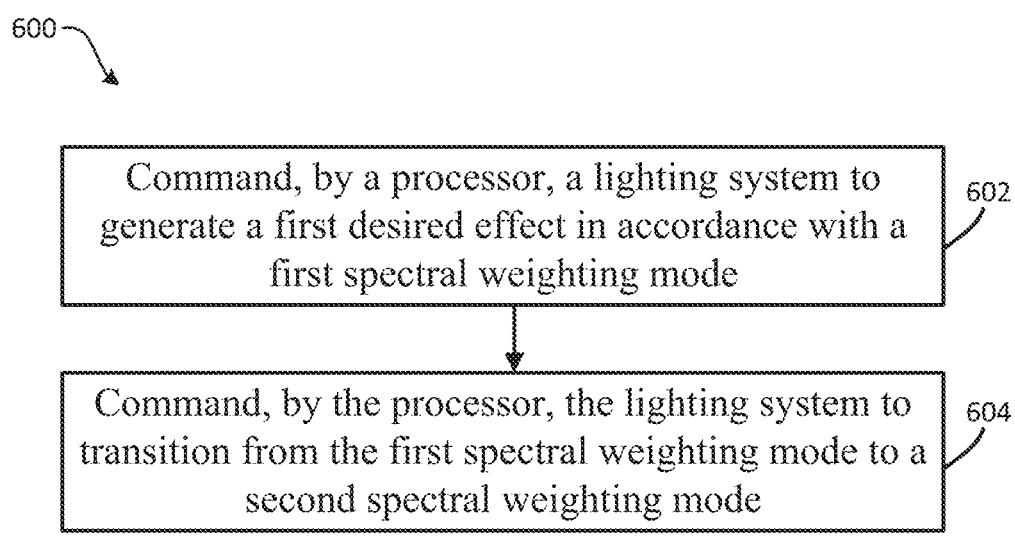
FIG. 6 is a schematic flow diagram showing a controller method, in accordance with various embodiments.

Referring now to FIG. 6, a method 600 configured to be performed by a processor of controller 130 from FIG. 2 is illustrated, in accordance with various embodiments. The method 600 comprises command, by a processor, a lighting system (e.g., lighting system 100) to generate a first desired effect in accordance with a first spectral weighting mode. The first spectral weighting mode may be any of the spectral weighting modes described previously herein. The first spectral weighting mode may be configured to optimize a predetermined variable (e.g., hypergamut, CRI, brightness, lumens, etc.) within a predetermined domain (e.g., chromacity coordinates (x,y), color temperature brightness (Kelvin), brightness (%), etc.). In various embodiments, the first spectral weighting mode may be predetermined based on a flight plan. For example, the first spectral weighting mode may correspond to boarding or the like.

The method 600 further comprises commanding, by the processor, the lighting system to transition from the first spectral weighting mode to a second spectral weighting mode 604. In this regard, the second spectral weighting mode may be desired to optimize for a second desired effect (e.g., optimize for food during meal time, optimize for melatonin at night time, etc.). In various embodiments, step 604 may be a pre-set time based on a flight plan. In various embodiments, step 604 may be a command received from an input in an aircraft cabin from an attendant or the like.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An article of manufacture including a tangible, non-transitory computer-readable storage medium having instructions stored thereon that, in response to execution by a processor, cause the processor to perform operations comprising:

command, by the processor, a lighting system to generate a first desired effect in accordance with a first spectral weighting mode;

determine, by the processor, a first optimized predetermined variable within a first predetermined domain to generate the first desired effect based on the first spectral weighting mode;

command, by the processor, the lighting system to transition from the first desired effect to a second desired effect, the second desired effect in accordance with a second spectral weighting mode; and determine by the processor, a second optimized predetermined variable within a second predetermined domain to generate the second desired effect based on the second spectral weighting mode, the first optimized predetermined variable being different from the second optimized predetermined variable.

2. The article of manufacture of claim 1, wherein the second predetermined domain is different from the first predetermined domain.

3. The article of manufacture of claim 1, wherein the first predetermined domain is chromacity coordinates, and wherein the second predetermined domain is color temperature brightness.

4. The article of manufacture of claim 1, wherein the operations further comprise:

command, by the processor, the lighting system to transition from the second desired effect to a third desired effect, the third desired effect in accordance with a third spectral weighting mode; and determine by the processor, a third optimized predetermined variable within a third predetermined domain to generate the third desired effect based on the third spectral weighting mode.

5. The article of manufacture of claim 4, wherein the third optimized predetermined variable is different from the second optimized predetermined variable and the first optimized predetermined variable.

6. The article of manufacture of claim 4, wherein the first predetermined domain, the second predetermined domain, and the third predetermined domain are all different.

7. The article of manufacture of claim 6, wherein the first predetermined domain is chromacity coordinates, wherein the second predetermined domain is color temperature brightness, and wherein the third predetermined domain is color brightness.

8. A lighting system, comprising:

a plurality of light emitting diodes (LEDs); and a controller in operable communication with the plurality of LEDs, the controller configured to transit the plurality of LEDs from a first spectral weighting mode to a second spectral weighting mode, the first spectral weighting mode configured to optimize a first variable of the lighting system over a first predetermined domain, the second spectral weighting mode configured to optimize a second variable of the lighting system over a second predetermined domain, the first predetermined domain being different from the second predetermined domain, the first spectral weighting mode corresponding to a first desired effect, the second spectral weighting mode corresponding to a second desired effect.

9. The lighting system of claim 8, wherein the plurality of LEDs comprise at least five LEDs.

10. The lighting system of claim 8, wherein the plurality of LEDs comprise at least six LEDs.

11. The lighting system of claim 8, wherein a first LED of the plurality of LEDs is configured to emit electromagnetic radiation having a first wavelength of between 490 nm and 510 nm and generate a cyan color.

12. The lighting system of claim 11, wherein the first variable is an intensity of the first LED and the first desired effect is wakefulness.

13. The lighting system of claim 11, wherein the first variable is maximized to achieve the first desired effect.

14. The lighting system of claim 8, wherein each LED in the plurality of LEDs is configured to emit an electromagnetic radiation having a wavelength, the wavelength being different for each LED in the plurality of LEDs.

* * * * *